(12) United States Patent
Hanamura

(10) Patent No.: US 6,862,949 B2
(45) Date of Patent: Mar. 8, 2005

(54) CONDUIT COVER FOR BICYCLE

(75) Inventor: Junichi Hanamura, Iwade (JP)

(73) Assignee: Shimano, Inc., Osaka (JP)

( * ) Notice: Subject to any disclaimer, the term of this patent is extended or adjusted under 35 U.S.C. 154(b) by 133 days.

(21) Appl. No.: 10/309,893

(22) Filed: Dec. 5, 2002

(65) Prior Publication Data

US 2004/0107792 A1 Jun. 10, 2004

(51) Int. Cl.$^7$ ................................................ F16C 1/26
(52) U.S. Cl. ..................................... 74/502.6; 74/500.5
(58) Field of Search ............................ 74/500.5, 502.4, 74/502.6

(56) References Cited

U.S. PATENT DOCUMENTS

| | | | |
|---|---|---|---|
| 1,995,795 A | | 3/1935 | Clark |
| 3,830,115 A | * | 8/1974 | Juy ............................ 74/502.6 |
| 3,893,647 A | * | 7/1975 | Kennedy .................... 248/68.1 |
| 4,156,373 A | * | 5/1979 | Juy ............................ 74/502.6 |
| 4,325,269 A | | 4/1982 | Nagano |
| 4,585,246 A | | 4/1986 | Diekman et al. |
| 4,733,835 A | * | 3/1988 | Schlanger et al. ............ 248/71 |
| 4,915,404 A | | 4/1990 | Chonan |
| 5,568,905 A | * | 10/1996 | Smith, II ...................... 248/65 |
| 5,803,654 A | * | 9/1998 | Spease et al. ............... 403/384 |
| 6,089,585 A | | 7/2000 | Theobald |
| 6,330,989 B1 | * | 12/2001 | Okamoto .................... 248/74.1 |
| 6,354,545 B1 | * | 3/2002 | Liao ............................ 248/214 |
| 6,725,978 B2 | * | 4/2004 | Karpowich .................. 188/20 |

FOREIGN PATENT DOCUMENTS

| | | | | |
|---|---|---|---|---|
| DE | 29708659 U1 | * | 7/1997 | ........... B62K/19/30 |
| EP | 0 695 682 A1 | | 2/1996 | |
| EP | 0 805 104 A2 | | 11/1997 | |
| JP | Sho58-65188 | | 5/1983 | |
| JP | Sho64-22593 | | 2/1989 | |
| JP | Hei3-56149 | | 12/1991 | |
| TW | 316569 | | 9/1997 | |

* cited by examiner

Primary Examiner—David A. Bucci
Assistant Examiner—Vicky A. Johnson
(74) Attorney, Agent, or Firm—Shinjyu Global IP Counselors, LLP

(57) ABSTRACT

A conduit cover is configured to protect hoses, wires, cables and the like that run along a portion of a bicycle frame. The conduit cover basically has a rigid body portion, a first contact portion and a second contact portion in which the body portion is substantially straight. The body portion and the first and second contact portions define a substantially straight longitudinally extending slot that is sized and configured to receive a conduit therein. The body portion preferably has a pair of at fixing portions with threaded bores for easy attachment to bicycle frame.

23 Claims, 7 Drawing Sheets

US 6,862,949 B2

CONDUIT COVER FOR BICYCLE

BACKGROUND OF THE INVENTION

1. Field of the Invention

This invention generally relates to a conduit cover for protecting hoses, wires, cables and the like that run along a portion of a bicycle frame. More specifically, the present invention relates to a conduit cover that attaches to a straight portion of a bicycle frame to protect hoses, wires, cables and the like.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

Recently, it has become very popular to ride bicycles off road. This presents a special problem in that sometimes hoses and/or wires at the bicycle can be caught in a branch such that the hose or wire becomes damaged. In particular, ordinary bicycle guides do not protect the hose or wire becoming damaged. Thus, the wires and hoses are sometimes located in the bicycle frame. However, this can increase the cost of the bicycle because the increased labor to install the wires and hoses inside the frame tubes.

In view of the above, it will be apparent to those skilled in the art that there exists a need for an improved conduit cover for protecting hoses, wires, cables and the like that run along a portion of a bicycle frame. This invention addresses this need in the prior art as well as other needs, which will become apparent to those skilled in the art from this disclosure.

SUMMARY OF THE INVENTION

One object of the present invention is to provide a conduit cover for protecting hoses, wires, cables and the like that run along a straight portion of a bicycle frame.

Another object of the present invention is to provide a conduit cover that is relatively inexpensive to manufacture.

Another object of the present invention is to provide a conduit cover that is relatively easy to install.

The foregoing object can basically be attained by providing a conduit cover for a bicycle that basically comprises a rigid body portion, a first contact portion and a second contact portion in which the body portion is substantially straight. The rigid body portion has a predetermined longitudinal length extending between a first end and a second end. The first contact portion is fixedly coupled along a first longitudinal side of the body portion. The second contact portion is fixedly coupled along a second longitudinal side of the body portion that is transversely spaced from the first longitudinal side. The body portion and the first and second contact portions define a substantially straight longitudinally extending slot that is sized and configured to receive a conduit therein.

The foregoing object can also be attained by providing a conduit cover for a bicycle that basically comprises a body portion, at least one fixing portion, a first contact portion and a second contact portion in which the body portion is attached to a bicycle element or frame via the fixing portion or portions. The body portion has a predetermined longitudinal length extending between a first end and a second end. The fixing portion is fixedly coupled to the body portion. The first contact portion is fixedly coupled along a first longitudinal side of the body portion. The second contact portion is fixedly coupled along a second longitudinal side of the body portion that is transversely spaced from the first longitudinal side. The body portion and the first and second contact portions define a longitudinally extending slot that is sized and configured to receive a conduit therein.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
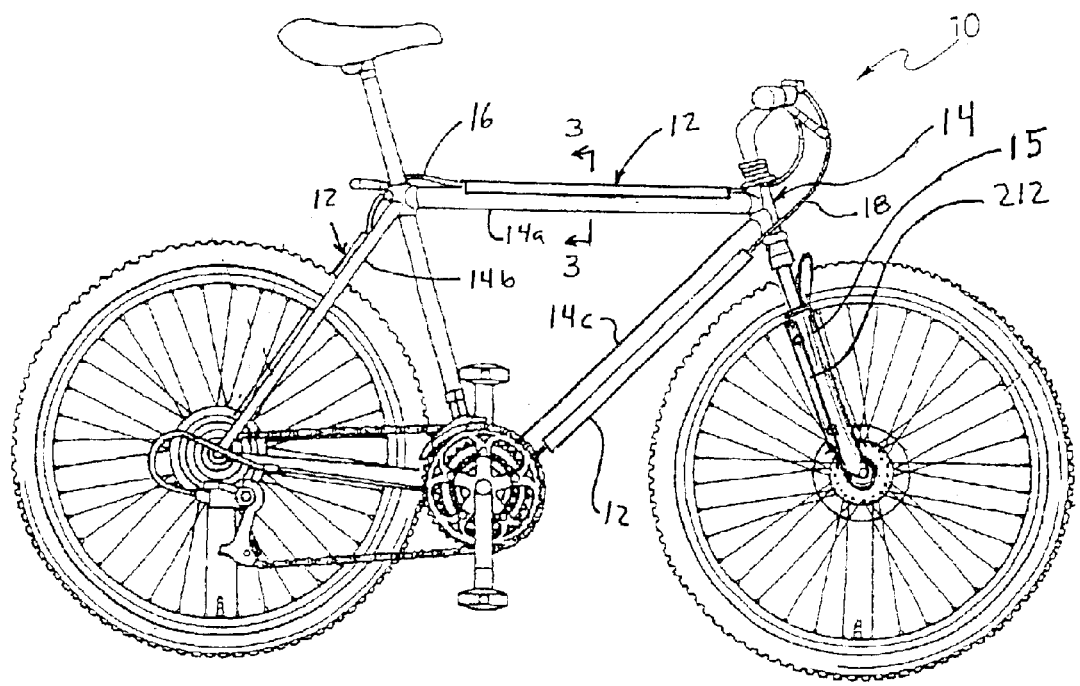
FIG. 1 is a side elevational view of a conventional bicycle with a plurality of conduit covers coupled thereto in accordance with a preferred embodiments of the present invention.
Figure 4:
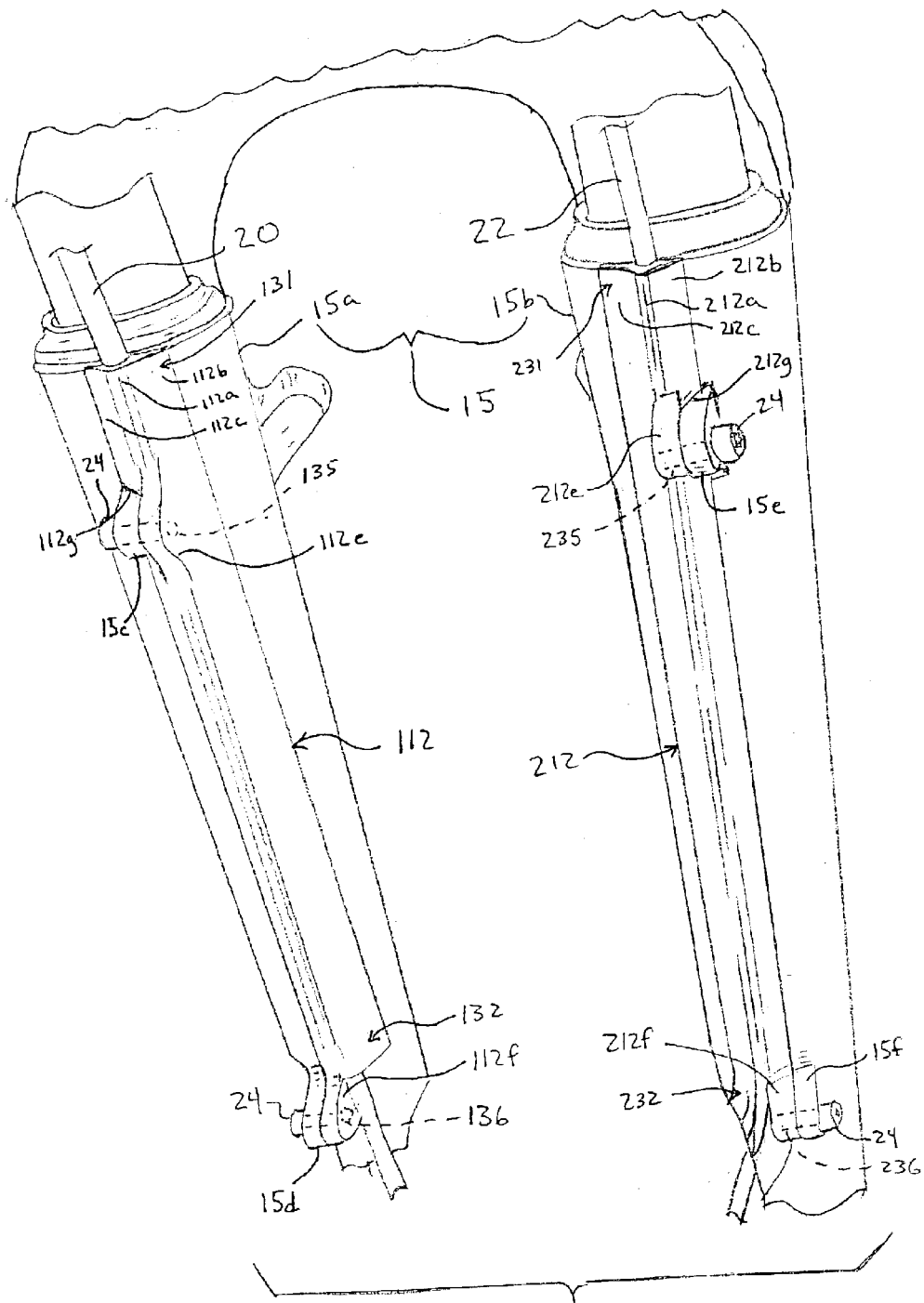
FIG. 4 is a partial, enlarged perspective view of two other conduit covers attached to the front fork of the bicycle of FIG. 1 in accordance with the second and third embodiments of the present invention.
Figure 5:
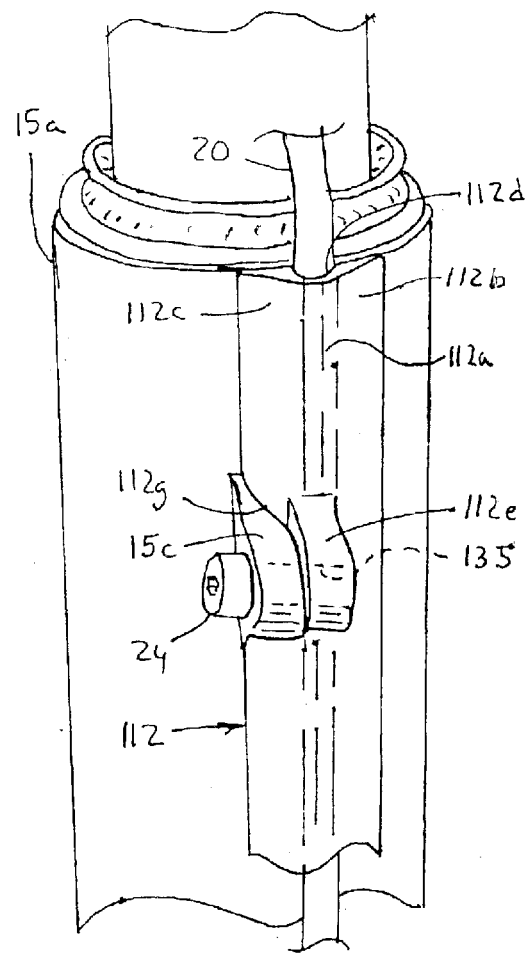
FIG. 5 is a partial enlarged perspective view of an upper section of the conduit cover for the disc brake hose illustrated in FIG. 4 in accordance with the second embodiment of the present invention.
Figure 6:
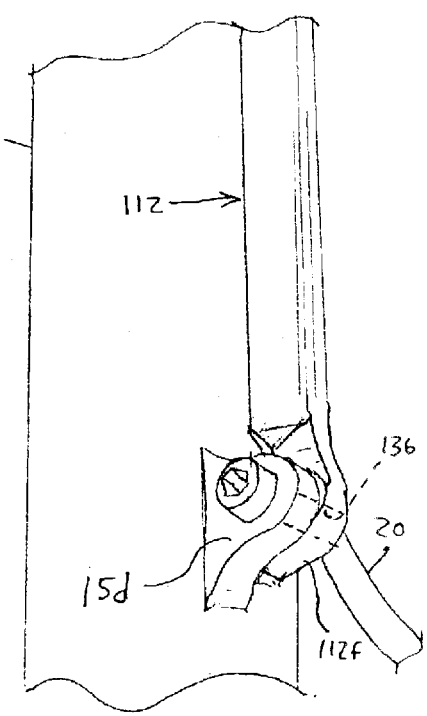
FIG. 6 is a partial enlarged perspective view of a lower section of the conduit cover illustrated in FIGS. 4 and 5 in accordance with the second embodiment of the present invention.
Figure 7:
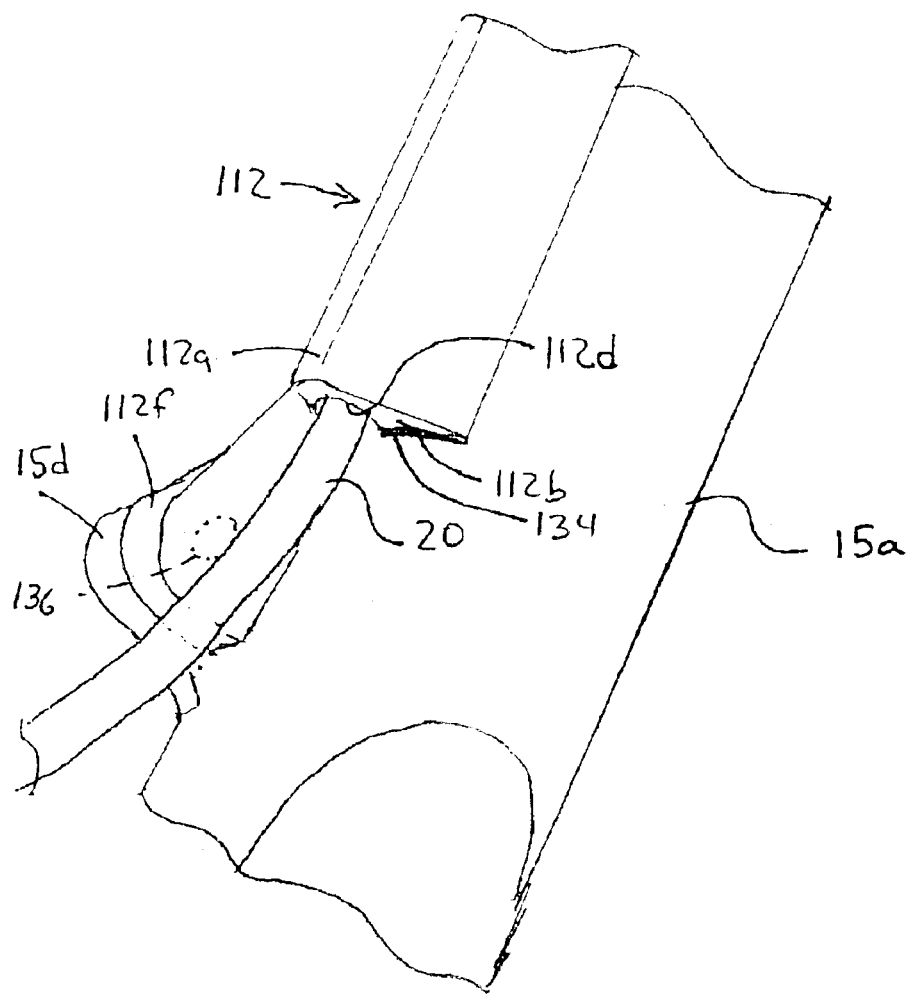
FIG. 7 is another partial, enlarged perspective view of the lower section of the conduit cover illustrated in FIGS. 4–6 in accordance with the second embodiment of the present invention.
Figure 8:
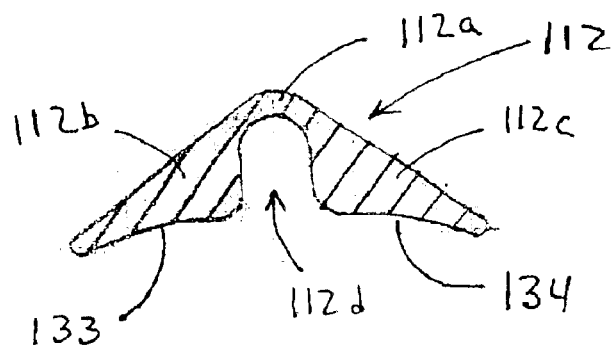
FIG. 8 is a partial, enlarged cross-sectional view of the conduit cover illustrated in FIGS. 4–7 in accordance with the second embodiment of the present invention.
Figure 9:
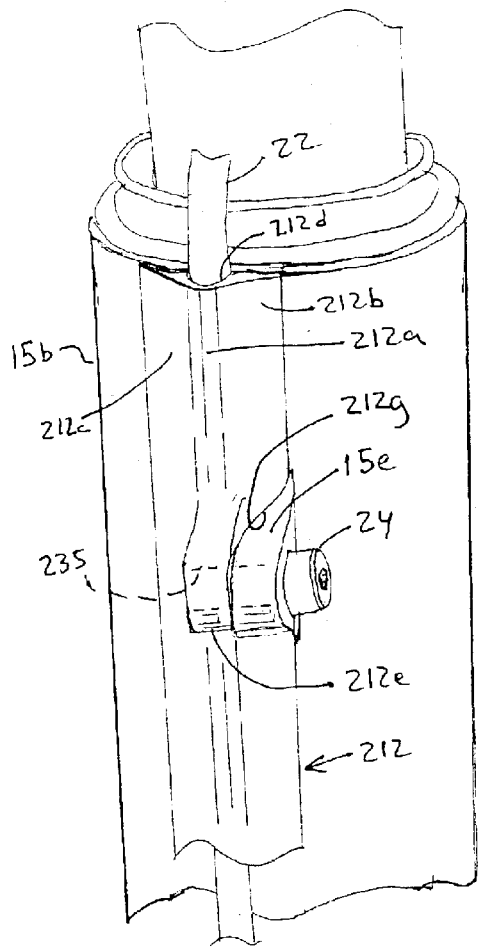
FIG. 9 is a partial, enlarged perspective view of an upper section of the conduit cover for the dynamo wire illustrated in FIG. 4 in accordance with the third embodiment of the present invention.
Figure 10:
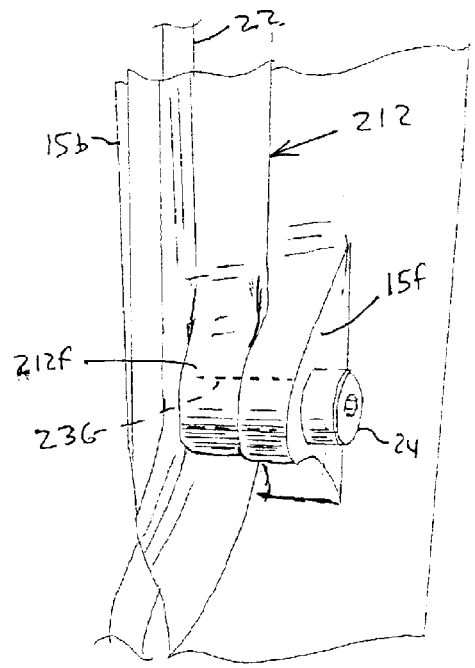
FIG. 10 is a partial, enlarged perspective view of a lower section of the conduit cover illustrated in FIGS. 4 and 9 in accordance with the third embodiment of the present invention.
Figure 11:
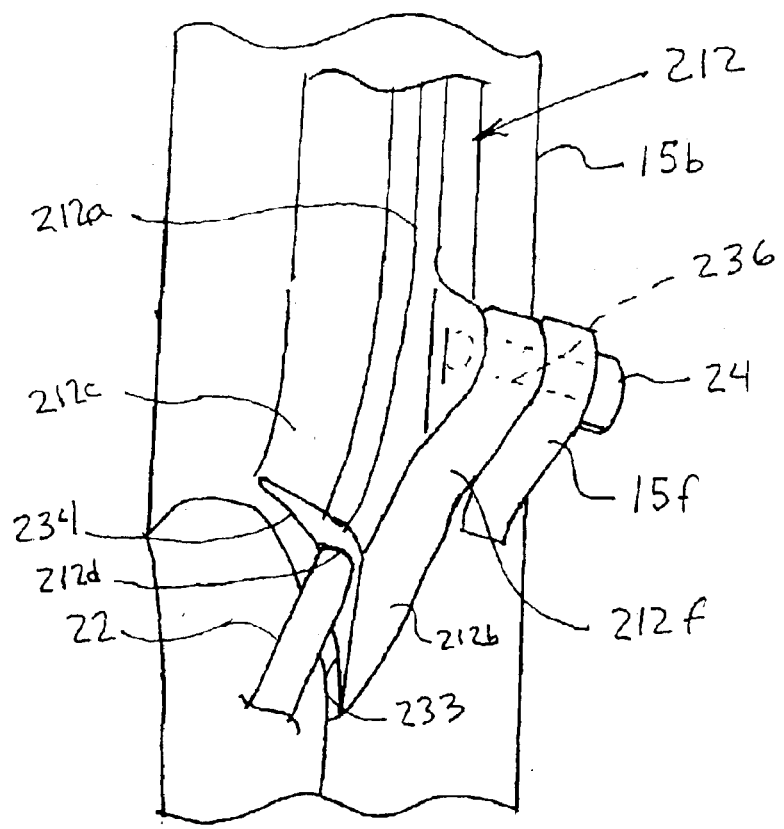
FIG. 11 is another partial, enlarged perspective view of the lower section of the conduit cover illustrated in FIGS. 4, 9 and 10 in accordance with the third embodiment of the present invention.
Figure 12:
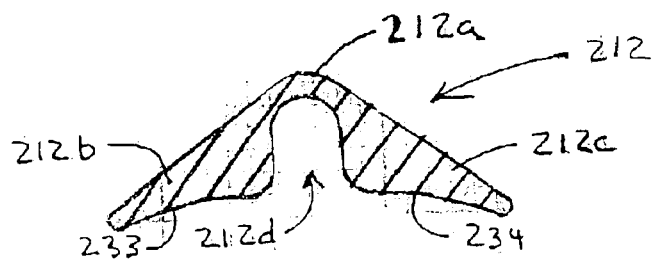
FIG. 12 is a partial, enlarged cross-sectional view of the conduit cover illustrated in FIGS. 4, 9–11 in accordance with the third embodiment of the present invention.

Referring initially to FIGS. 1 and 4, a bicycle 10 is illustrated with a plurality of conduit covers 12, 112 and 212 coupled to the bicycle frame 14 in accordance with preferred embodiments of the present invention as discussed below. The conduit covers 12, 112 and 212 are arranged and configured to protect hoses, wires, cables and the like that run along a portion of a bicycle part or frame portion.

In the illustrated embodiment, a first one of the conduit covers 12 is coupled to a section of a top tube 14a of the frame 14 for covering a portion of a rear hydraulic brake hose 16. A second one of the conduit covers 12 is coupled to a section of a seat stay 14b of the frame 14 for covering another portion of a rear hydraulic brake hose 16. A third one of the conduit covers 12 is coupled to a section of a down tube 14c of the frame 14 for covering a portion of a shift cable 18. As seen in FIG. 4, the conduit cover 112 is coupled to a section of a front suspension fork 15 for covering a front hydraulic brake hose 20. As also seen in FIG. 4, the conduit cover 212 is coupled to a section of the front suspension fork 15 for covering a dynamo wire 22 of a dynamo formed in the front hub.

Each of the conduit covers 12 are identical in construction, except for the size which is made to match the size (length and diameter) of the frame section to which it is attached. The conduit covers 12 are fixedly coupled to the corresponding section of the frame 14 by a suitable adhesive or by welding. The conduit covers 12 are constructed of a hard rigid material that does not substantially bend. For example, the conduit cover is preferably constructed of a metallic material such as aluminum. The conduit covers 112 and 212 are substantially identical to the conduit covers 12, except that the conduit covers 112 and 212 are modified to be removably attached to the front suspension fork 15 by fasteners and the lower end of the conduit cover 212 is curved as explained below.

Figure 2:
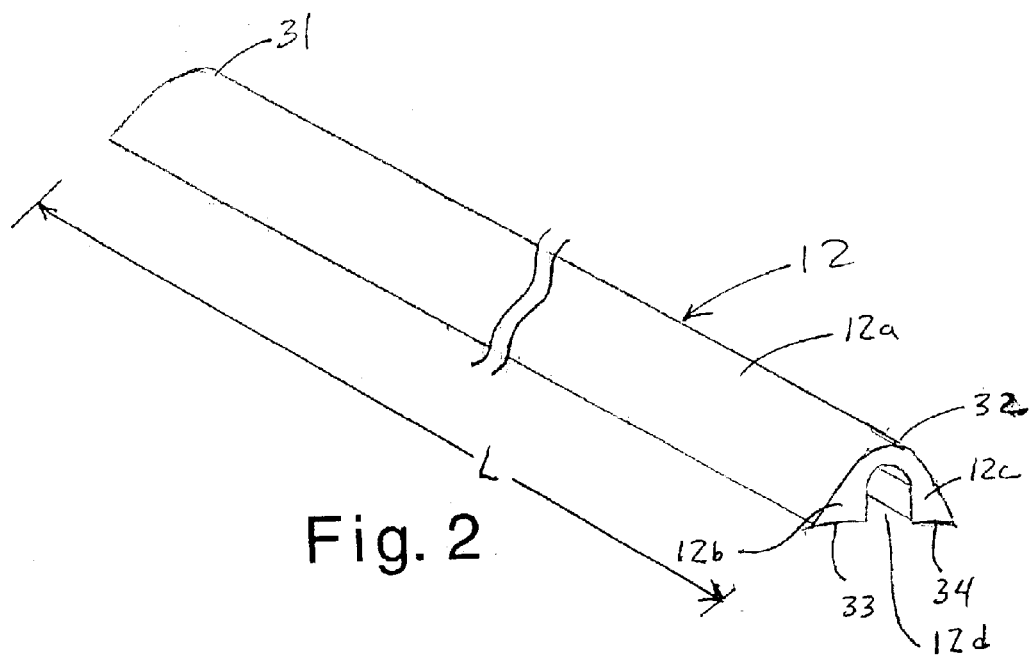
FIG. 2 is a partial, enlarged perspective view of one of the conduit covers illustrated in FIG. 1 in accordance with a first embodiment of the present invention.
Figure 3:
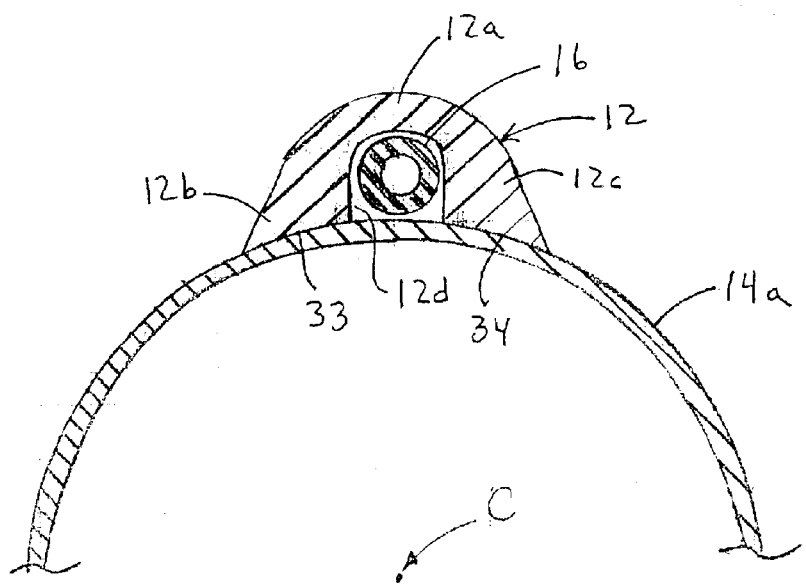
FIG. 3 is partial, enlarged cross-sectional view of the conduit cover illustrated in FIG. 2 in accordance with the first embodiment of the present invention as seen along section line 3—3 of FIG. 1.

Referring now to FIGS. 2 and 3, each of the conduit covers 12 basically comprises a body portion 12a, a first contact portion 12b and a second contact portion 12c that define a substantially straight longitudinally extending slot 12d that is sized and configured to receive the conduit 16 therein. The body portion 12a and the first and second contact portions 12b and 12c are integrally formed together as a one-piece, unitary member from a single material. The body portion 12a is substantially straight along its entire length so that it can be easily mounted to a straight portion of the bicycle frame 14. Thus, the body portion 12a has a predetermined longitudinal length L extending between a first free end 31 and a second free end 32. The predetermined longitudinal length L of the body portion 12a is at least greater than 200 millimeters, preferably about 210 millimeters. In this embodiment, the body portion 12a and the first and second contact portions 12b and 12c has a uniform transverse cross-section.

The first contact portion 12b is fixedly coupled along a first longitudinal side of the body portion 12a. The first contact portion 12b has a first curved attachment surface 33 with its radius of curvature located at a center C that preferably substantially coincides with the curvature of the bicycle section that the conduit cover 12 is attached. The second contact portion 12c is fixedly coupled along a second longitudinal side of the body portion 12a that is transversely spaced from the first longitudinal side. The first and second contact portions 12b and 12c contact the outer surface of the bicycle section where the conduit cover 12 is attached such that the conduit cover 12 extends longitudinally along the bicycle section. The second contact portion 12c has a second curved attachment surface 34 with its radius of curvature located at the center C that preferably substantially coincides with the curvature of the bicycle section where the conduit cover 12 is attached. Thus, the first and second contact portions 12b and 12c have attachment surfaces 33 and 34 that have curvatures with the common center C.

Referring now to FIGS. 4–10, the conduit covers 112 and 212 are coupled to the front suspension fork 15 in accordance with second and third embodiments of the present invention. The conduit covers 112 and 212 are configured to protect hoses, wires, cables and the like that run along a section of the front suspension fork 15. Preferably, the conduit covers 112 and 212 are coupled to the rearwardly facing side of the front suspension fork 15. The conduit cover 112 is fixedly coupled to a first fork tube 15a of the front suspension fork 15 for covering the front hydraulic brake hose 20. The conduit cover 212 is fixedly coupled to a second fork tube 15b of the front suspension fork 15 for covering the dynamo wire 22. The conduit covers 112 and 212 are fixedly coupled to the corresponding section of the front suspension fork 15 by bolts 24 as discussed below in more detail. The conduit covers 112 and 212 are constructed of a hard rigid material that does not substantially bend. For example, the conduit covers 112 and 212 are preferably constructed of a metallic material such as aluminum.

Referring now to FIGS. 4–8, the conduit cover 112 basically comprises a body portion 112a, a first contact portion 112b and a second contact portion 112c that define a straight longitudinally extending slot 112d that is sized and configured to receive the front hydraulic brake hose 20 therein. In this embodiment, a pair of fixing portions 112e and 112f are formed the conduit cover 112. In other words, the body portion 112a, the first and second contact portions 112b and 112c and the fixing portions 112e and 112f are integrally formed together as a one-piece, unitary member from a single material. The body portion 112a is substantially straight along its entire length, except for the areas adjacent the fixing portions 112e and 112f. Thus, the body portion 112a has a predetermined longitudinal length extending between a first or upper free end 131 and a second or lower free end 132. The predetermined longitudinal length of the body portion 112a is at least greater than 200 millimeters, preferably about 210 millimeters. In this embodiment, the body portion 112a and the first and second contact portions 112b and 112c has a uniform transverse cross-section, except for the areas forming the fixing portions 112e and 112f.

The first contact portion 112b is fixedly coupled along a first longitudinal side of the body portion 112a. The first contact portion 112b has a first curved attachment surface 133 with its radius of curvature located at a center that preferably substantially coincides with the curvature of the first fork tube 15a of the front suspension fork 15 where the conduit cover 112 is attached. The second contact portion 112c is fixedly coupled along a second longitudinal side of the body portion 112a that is transversely spaced from the first longitudinal side. The first and second contact portions 112b and 112c contact the outer surface of the first fork tube 15a where the conduit cover 112 is attached such that the conduit cover 112 extends longitudinally along the first fork tube 15a. The second contact portion 112c has a second curved attachment surface 134 with its radius of curvature located at the center that preferably substantially coincides with the curvature of the first fork tube 15a where the conduit cover 112 is attached. Thus, the first and second contact portions 112b and 112c have attachment surfaces 133 and 134 that have curvatures with the common center.

The upper fixing portion 112e has a threaded bore 135 that has its axis extending in a direction substantially perpendicular to the longitudinal length of the body portion 112a. Similarly, the lower fixing portion 112f has a threaded bore 136 that has its axis extending in a direction substantially perpendicular to the longitudinal length of the body portion 112a. Preferably, the threaded bores 135 and 136 are blind bores that threadedly receive a pair of the bolts 24.

In this embodiment, the fixing portions 112e and 112f are offset in a transverse direction relative to the longitudinal axis. Specifically, the first or upper fixing portion 112e is located substantially along the center longitudinal axis of the body portion 112a. A slot or notch 112g is formed in the second contact portion 112c at the point that is located adjacent to the upper fixing portion 112e. The slot or notch 112g is sized to receive a mounting flange or member 15c that is formed on the first fork tube 15a. Basically, the mounting member 15c of the fork tube 15a has a hole for receiving one of the bolts 24 therethrough.

The second or lower fixing portion 112f extends longitudinal from the lower free end 132 of the second contact portion 112c. Thus, the lower fixing portion 112f is offset to one of the longitudinal sides (the second contact portion 112c) of the body portion 112a. The lower fixing portion 112f meets with a lower mounting flange or member 15d formed on the lower section of the fork tube 15a. The mounting member 15d of the fork tube 15a has a hole for receiving one of the bolts 24 therethrough. Accordingly, the holes of the mounting members 15c and 15d are longitudinally spaced apart so as to be aligned with the blind bores 135 and 136. When the bolts 24 are inserted through the holes of the mounting members 15c and 15d, the bolts 24 are threaded into the blind bores 135 and 136 such that the conduit cover 112 is securely attached to the fork tube 15a for overlying the hydraulic brake hose 20.

Referring now to FIGS. 9–12, the conduit cover 212 basically comprises a body portion 212a, a first contact portion 212b and a second contact portion 212c that define a substantially straight longitudinally extending slot 212d that is sized and configured to receive the dynamo wire 22 therein. In this embodiment, a pair of fixing portions 212e and 212f are formed the conduit cover 212. In other words, the body portion 212a, the first and second contact portions 212b and 212c and the fixing portions 212e and 212f are integrally formed together as a one-piece, unitary member from a single material. The body portion 212a is substantially straight along its entire length, except for the lower end section, which is curved so that it can be easily mounted to a straight portion of the second fork tube 15b of the front suspension fork 15. Thus, the body portion 212a has a predetermined longitudinal length extending between a first or upper free end 231 and a second or lower free end 232. The predetermined longitudinal length of the body portion 212a is at least greater than 200 millimeters, preferably about 210 millimeters. In this embodiment, the body portion 212a and the first and second contact portions 212b and 212c has a uniform transverse cross-section, except for the areas forming the fixing portions 212e and 212f and the lower curved section.

The first contact portion 212b is fixedly coupled along a first longitudinal side of the body portion 212a. The first contact portion 212b has a first curved attachment surface 233 with its radius of curvature located at a center that preferably substantially coincides with the curvature of the second fork tube 15b of the front suspension fork 15 where the conduit cover 212 is attached. The second contact portion 212c is fixedly coupled along a second longitudinal side of the body portion 212a that is transversely spaced from the first longitudinal side. The first and second contact portions 212b and 212c contact the outer surface of the second fork tube 15b where the conduit cover 212 is attached such that the conduit cover 212 extends longitudinally along the second fork tube 15b. The second contact portion 212c has a second curved attachment surface 234 with its radius of curvature located at the center that preferably substantially coincides with the curvature of the bicycle section where the conduit cover 212 is attached. Thus, the first and second contact portions 212b and 212c have attachment surfaces 233 and 234 that have curvatures with the common center.

The upper fixing portion 212e has a threaded bore 235 that has its axis extending in a direction substantially perpendicular to the longitudinal length of the body portion 212a. Similarly, the lower fixing portion 212f has a threaded bore 236 that has its axis extending in a direction substantially perpendicular to the longitudinal length of the body portion 212a. Preferably, the threaded bores 235 and 236 are blind bores that threadedly receive a pair of the bolts 24.

In this embodiment, the fixing portions 212e and 212f are offset in a transverse direction relative to the longitudinal axis. Specifically, the first or upper fixing portion 212e is located substantially along the center longitudinal axis of the body portion 212a. A slot or notch 212g is formed in the first contact portion 212b at the point that is located adjacent to the upper fixing portion 212e. The slot or notch 212g is sized to receive a mounting flange or member 15e that is formed on the second fork tube 15b. Basically, the mounting member 15e of the fork tube 15b has a hole for receiving one of the bolts 24 therethrough.

The second or lower fixing portion 212f extends longitudinal from the lower free end 232 of the first contact portion 212b. Thus, the lower fixing portion 212f is offset to one of the longitudinal sides (the first contact portion 212b) of the body portion 212a. The lower fixing portion 212f meets with a lower mounting flange or member 15f formed on the lower section of the fork tube 15b. The mounting member 15f of the fork tube 15b has a hole for receiving one of the bolts 24 therethrough. Accordingly, the holes of the mounting members 15e and 15f are longitudinally spaced apart so as to be aligned with the blind bores 235 and 236. When the bolts 24 are inserted through the holes of the mounting members 15e and 15f, the bolts 24 are threaded into the blind bores 235 and 236 such that the conduit cover 212 is securely attached to the fork tube 15a for overlying the dynamo wire 22.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A conduit cover for a bicycle comprising:
   a rigid body portion having a predetermined longitudinal length extending between a first end and a second end;
   a first contact portion having a first curved attachment surface and fixedly coupled along a first longitudinal side of the body portion; and
   a second contact portion having a second curved attachment surface and fixedly coupled along a second longitudinal side of the body portion that is transversely spaced from the first longitudinal side,
   the body portion and the first and second contact portions define a substantially uniform transverse cross section and a substantially straight longitudinally extending slot that is opened toward the first and second contact portions such that the first and second curved attachment surfaces are separated by an opening of the slot.

2. The conduit cover according to claim 1, wherein the body portion and the first and second contact portions are formed together as a one-piece, unitary member.

3. The conduit cover according to claim 1, further comprising
   at least one fixing portion coupled to one of the body portion and the first and second contact portions.

4. The conduit cover according to claim 3, wherein the body portion, the at least one fixing portion and the first and second contact portions are form together as a one-piece, unitary member.

5. The conduit cover according to claim 3, wherein the at least one fixing portion includes a threaded bore that has its axis extending in a direction substantially perpendicular to the predetermined longitudinal length of the body portion.

6. The conduit cover according to claim 5, wherein the threaded bore is a blind bore.

7. The conduit cover according to claim 1, wherein the first and second curved attachment surfaces have curvatures with a common center.

8. The conduit cover according to claim 1, further comprising
   at least one fixing portion coupled to one of the body portion and the first and second contact portions.

9. The conduit cover according to claim 8, wherein the body portion, the at least one fixing portion and the first and second contact portions are formed together as a one-piece, unitary member.

10. The conduit cover according to claim 8, wherein the at least one fixing portion includes a threaded bore that has its axis extending in a direction substantially perpendicular to the predetermined longitudinal length of the body portion.

11. The conduit cover according to claim 10, wherein the threaded bore is as blind bore.

12. The conduit cover according to claim 11, wherein the predetermined longitudinal length of the body portion is at least greater than 200 millimeters.

13. The conduit cover according to claim 1, wherein the predetermined longitudinal length of the body portion is at least greater than 200 millimeters.

14. A conduit cover for a bicycle comprising:
    a body portion having a predetermined longitudinal length extending between a first end and a second end;
    a first contact portion having a first curved attachment surface and fixedly coupled along a first longitudinal side of the body portion;
    a second contact portion having a second curved attachment surface and fixedly coupled along a second longitudinal side of the body portion that is transversely spaced from the first longitudinal side; and
    at least one fixing portion coupled to one of the body portion and the first and second contact portions,
    the body portion and the first and second contact portions defining a extending slot that is opened toward the first and second contact portions such that the first and second curved attachment surfaces are separated by an opening of the slot.

15. The conduit cover according to claim 14, wherein the body portion, the at least one fixing portion and the first and second contact portions are formed together as a one-piece, unitary member.

16. The conduit cover according to claim 14, wherein the at least one fixing portion includes a threaded bore that has its axis extending in a direction substantially perpendicular to the predetermined longitudinal length of the body portion.

17. The conduit cover according to claim 16, wherein the threaded bore is a blind bore.

18. The conduit cover according to claim 14, wherein the first and second curved attachment surfaces have curvatures with a common center.

19. The conduit cover according to claim 18, wherein the body portion, the at least one fixing portion and the first and second contact portions are formed together as a one-piece, unitary member.

20. The conduit cover according to claim 18, wherein the at least one fixing portion includes a threaded bore that has its axis extending in a direction substantially perpendicular to the predetermined longitudinal length of the body portion.

21. The conduit cover according to claim 20, wherein the threaded bore is a blind bore.

22. The conduit cover according to claim 21, wherein the predetermined longitudinal length of the body portion is at least greater than 200 millimeters.

23. The conduit cover according to claim 14, wherein the predetermined longitudinal length of the body portion is at least greater than 200 millimeters.

* * * * *